(No Model.)
W. SCOTT.
PAWL AND RATCHET MECHANISM.
No. 330,931. Patented Nov. 24, 1885.
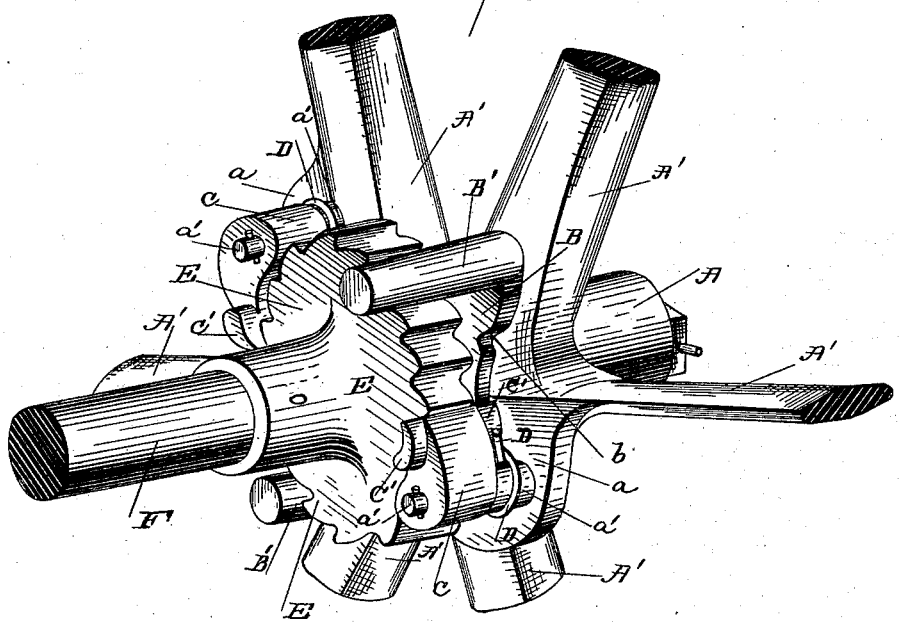
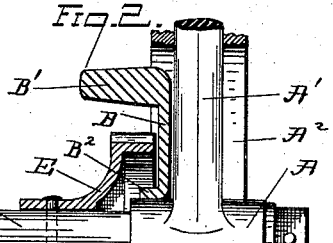
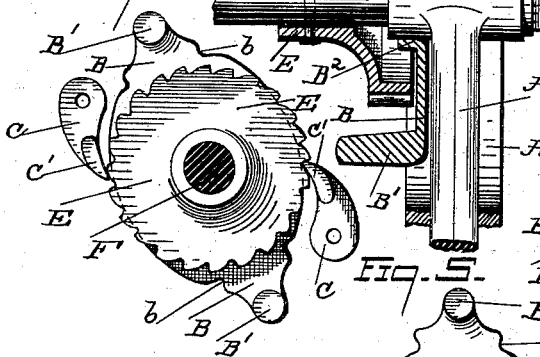
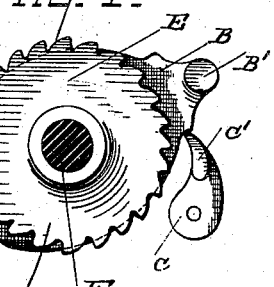
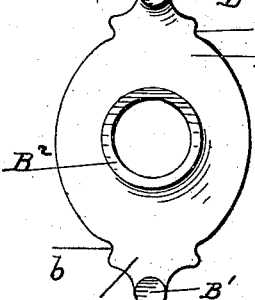
WITNESSES=
INVENTOR=
Walter Scott

UNITED STATES PATENT OFFICE.

WALTER SCOTT, OF HOOSICK FALLS, NEW YORK.

PAWL-AND-RATCHET MECHANISM.

SPECIFICATION forming part of Letters Patent No. 330,931, dated November 24, 1885.

Application filed October 15, 1885. Serial No. 179,938. (No model.)

*To all whom it may concern:*

Be it known that I, WALTER SCOTT, of the village of Hoosick Falls, county of Rensselaer, and State of New York, have made a certain new and useful Improvement in Pawl-and-Ratchet Devices for Driving Machinery; and I do declare the following to be a full, clear, and accurate description of the same, reference being had to the accompanying drawings, making a part of this specification, in which—

Figure 1 is a view in perspective of the device complete. Fig. 2 is a view, partly in elevation and partly in cross-section, of the axle, ratchets, pawls, wheel, and the connection between the wheel and ratchet device, which I term a "movable plate." Fig. 3 is an elevation of a section of the ratchet, pawls, and plate, showing the pawls in connection with the ratchet-teeth. Fig. 4 is a view of the same, showing the pawls out of connection with the ratchet and in connection with the plate. Fig. 5 is an elevation of the plate detached from the other parts.

Similar letters of reference refer to the same parts.

The nature and object of this invention is to provide a pawl-and-ratchet movement which will give motion to the main shaft when the driving-wheel is turned in one direction, and will allow the shaft to remain idle when turned in an opposite direction, and at the same time to provide mechanism by means of which the operator can at will so disengage the pawl from the ratchet as to allow the free movement of the driving-wheel in either direction.

In the drawings I have shown the device attached to one of the wheels of a mowing-machine; but it is plain that the same device may be placed on other machines.

F is the axle or main shaft on which is mounted the driving-wheel A. The spokes are shown at A', the rim at $A^2$.

E is the ratchet-wheel, fast to main shaft F. This ratchet-wheel is provided with the usual ratchet-teeth on its outer periphery, into which engage the pawls $c$. Two only are shown in the drawings; but one may be used or any number, as required. These pawls turn freely on studs $a'$, fastened to the arms of the driving-wheel, and are held in connection with the ratchet-teeth by means of springs D, which are fast at one end to the spoke, while the other end presses against the pawl. The plate D turns freely on the hub of the driving-wheel between the spokes and the ratchet, the hub of the wheel passing through the hole $B^2$; or the plate may be so arranged as to turn on the shaft—if the hub of the driving-wheel is not long enough. The plate D is provided with notches or indentations $b$ at each end and on opposite sides of its perimeter. The pawls are provided with projections $c'$ on their sides and at their pivots, which extend sidewise from the edge of the pawl, so that their pivots are made wide enough to extend beyond the face of the ratchet-teeth, in order that they may engage with the indentations $b$ in the plate B when required. The plate B is provided at each end with projections or handles B', by means of which the operator can rotate the plate B. It will be seen that the plate B has two notches like $b$, and opposite. The object of this construction is to allow them to be interchangeable from one side of the mowing-machine to the other when the machine is constructed to use two wheels, and the projections on the pawls are also made to project on both sides of the pawl for the same reason, so that by this construction it will allow the same pieces to be used on either side or either wheel, and does not require them to be made in right or left hand pairs.

When the operator, in his seat on the machine, desires to throw the pawls out of contact with the ratchet-teeth, he places his foot on the arm B' and turns the plate B, and the eccentric shape of the edge of plate B will move the pivot of the pawl upward along its surface until it is held in the depression $b$; the spring D on the pawl holding it there. When this is done, the wheel will turn freely on the axle without giving motion to it. When the reverse motion is given to plate B, the pawl will be engaged with the ratchet-teeth, and motion will be imparted to the shaft and machinery connected with it.

Having thus fully described my invention, what I claim therein as new, and desire to secure by Letters Patent, is—

The combination of the external ratchet, E, fast upon the shaft, with the swinging plate B, spring-pawl c', and driving-wheel A, constructed and arranged substantially as and for the purpose set forth.

WALTER SCOTT.

Witnesses:
   HERMANN L. MATZ,
   DANFORTH GEER.